United States Patent
Hart et al.

(10) Patent No.: US 8,430,784 B2
(45) Date of Patent: Apr. 30, 2013

(54) MULTI-SPEED TRANSMISSION HAVING FOUR PLANETARY GEAR SETS

(75) Inventors: James M. Hart, Belleville, MI (US); Scott H. Wittkopp, Ypsilanti, MI (US); Edward W. Mellet, Rochester Hills, MI (US); Andrew W. Phillips, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/211,860

(22) Filed: Aug. 17, 2011

(65) Prior Publication Data

US 2013/0045829 A1 Feb. 21, 2013

(51) Int. Cl.
*F16H 3/62* (2006.01)

(52) U.S. Cl.
USPC .............. 475/276; 475/278; 475/279

(58) Field of Classification Search .......... 475/276, 475/278, 279, 280, 288, 290, 903
See application file for complete search history.

(56) References Cited

U.S. PATENT DOCUMENTS

| 7,404,782 | B2 * | 7/2008 | Kudoh et al. ............... 475/337 |
| 2009/0036256 | A1 * | 2/2009 | Hukill et al. ............... 475/276 |
| 2009/0088289 | A1 * | 4/2009 | Baldwin ..................... 475/276 |

* cited by examiner

*Primary Examiner* — Edwin A Young

(57) ABSTRACT

A transmission is provided having an input member, an output member, two planetary gear sets, another two planetary gear sets that may be stacked or nested to form a planetary gear set assembly, a plurality of coupling members and a plurality of torque transmitting devices. Each of the planetary gear sets includes first, second and third members. The stacked or nested planetary gear set assembly has a carrier member for rotatably supporting a first plurality of pinion gears and a second plurality of pinion gears, a ring gear and a common member. Further, the two other planetary gear sets may be configured to form a Simpson gear train. The torque transmitting devices include clutches and brakes.

20 Claims, 3 Drawing Sheets

| GEAR STATE | GEAR RATIO | RATIO STEP | TORQUE TRANSMITTING ELEMENTS ||||||
|---|---|---|---|---|---|---|---|---|
| | | | 30,130 | 32,132 | 34,134 | 36,136 | 26,126 | 28,128 |
| REV | -4.760 | | X | | | X | | |
| N | | -1.08 | | | | O | | |
| 1ST | 4.420 | | | X | | X | | |
| 2ND | 2.800 | 1.58 | | | | X | | X |
| 3RD | 2.125 | 1.32 | | X | | | | X |
| 4TH | 1.500 | 1.42 | | | X | | | X |
| 5TH | 1.178 | 1.27 | X | | | | | X |
| 6TH | 1.000 | 1.18 | | | | | X | X |
| 7TH | 0.851 | 1.17 | X | | | | X | |
| 8TH | 0.722 | 1.18 | | | X | | X | |
| 9TH | 0.621 | 1.16 | | X | | | X | |

X = ON - ENGAGED CARRYING TORQUE
O = ON - ENGAGED NOT CARRYING TORQUE

FIG. 5

MULTI-SPEED TRANSMISSION HAVING FOUR PLANETARY GEAR SETS

FIELD

The invention relates generally to a multiple speed transmission having a plurality of planetary gear sets and a plurality of torque transmitting devices and more particularly to a transmission having nine or more speeds, two planetary gear sets, another two planetary gear sets that are stackable and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A multi-speed transmission is provided having an input member, an output member, two planetary gear sets, another two planetary gear sets that are stackable to form a stacked or nested planetary gear set assembly, a plurality of coupling members and a plurality of torque transmitting devices. Each of the two planetary gear sets includes first, second and third members. The stacked or nested planetary gear set assembly has a sun gear, a carrier member for rotatably supporting a first plurality of pinion gears and a second plurality of pinion gears, a common member and a ring gear. The common member is a ring and a sun gear integrally formed as a unitary member or a ring and a sun gear joined by a rigid fixed connection (i.e. a shaft or hub). The torque transmitting devices are for example clutches and brakes. The two planetary gear sets that are not stacked are combinable to form a Ravigneaux gear train.

In another embodiment of the present invention, a transmission is provided having an input shaft, an output shaft, a planetary gear set assembly having a first member, a second member, a third member, a fourth member and a fifth member, a first planetary gear set having a first, a second and a third member, a second planetary gear set having a first, a second and a third member, a first interconnecting member continuously interconnecting the fourth member of the planetary gear set assembly with the first member of the first planetary gear set, a second interconnecting member continuously interconnecting the second member of the first planetary gear set with the second member of the second planetary gear set, a third interconnecting member continuously interconnecting the third member of the first planetary gear set with the third member of the second planetary gear set and six torque transmitting mechanism.

In yet another embodiment of the present invention, a first torque transmitting mechanism is selectively engageable to interconnect the second member of the second planetary gear set and the second member of the first planetary gear set with the input member.

In yet another embodiment of the present invention, a second torque transmitting mechanism is selectively engageable to interconnect the first member of the second planetary gear set with the input member.

In yet another embodiment of the present invention, a third torque transmitting mechanism is selectively engageable to interconnect the first member of the planetary gear set assembly with a stationary member.

In yet another embodiment of the present invention, a fourth torque transmitting mechanism is selectively engageable to interconnect the second member of the planetary gear set assembly with a stationary member.

In yet another embodiment of the present invention, a fifth torque transmitting mechanism is selectively engageable to interconnect the fourth member of the planetary gear set assembly with the stationary member.

In yet another embodiment of the present invention, a sixth torque transmitting mechanism is selectively engageable to interconnect the second member of the first planetary gear set and the second member of the second planetary gear set with the stationary member.

In yet another embodiment of the present invention, the torque transmitting mechanisms are selectively engageable in combinations of at least two to establish at least nine forward speed ratios and at least one reverse speed ratio between the input member and the output member.

In yet another embodiment of the present invention, the common member of the planetary gear set assembly is a gear having an outer surface and an inner surface. The outer surface has a plurality of gear teeth and the inner surface has a plurality of gear teeth. The plurality of gear teeth disposed on the inner surface mesh with the first plurality of pinion gears and the plurality of gear teeth disposed on the outer surface mesh with the second plurality of pinion gears.

In another embodiment of the present invention, the torque transmitting mechanisms are selectively engageable in combinations of at least three to establish at least nine forward speed ratios and at least one reverse speed ratio between the input member and the output member.

In still another embodiment of the present invention, a nine speed transmission is provided having an input shaft, an output shaft, a first planetary gear set assembly, a second planetary gear set assembly, an interconnecting member and six torque transmitting mechanisms.

In still another embodiment of the present invention, the first planetary gear set assembly has a sun gear, a carrier member for rotatably supporting a first plurality of pinion gears and a second plurality of pinion gears, a ring gear and a common member.

In still another embodiment of the present invention, the first plurality of pinion gears are disposed radially inward of the common member and the second plurality of pinion gears are disposed radially outward of the common member.

In still another embodiment of the present invention, the second planetary gear set assembly has a first and a second sun gear, a carrier member for rotatably supporting a first and a second plurality of pinion gears and a ring gear member.

In still another embodiment of the present invention, the interconnecting member continuously interconnects the ring gear of the first planetary gear set assembly with the first sun gear of the second planetary gear set assembly.

In still another embodiment of the present invention, the first torque transmitting mechanism is selectively engageable to interconnect the common member of the first planetary gear set assembly and the input member with the second sun gear of the second planetary gear set assembly.

In still another embodiment of the present invention, the second torque transmitting mechanism is selectively engageable to interconnect the common member of the first planetary gear set assembly and the input member with the carrier member of the second planetary gear set assembly.

In still another embodiment of the present invention, the third torque transmitting mechanism is selectively engageable to interconnect the sun gear of the first planetary gear set assembly with a stationary member.

In still another embodiment of the present invention, the fourth torque transmitting mechanism is selectively engageable to interconnect the carrier member of the first planetary gear set assembly with the stationary member.

In still another embodiment of the present invention, the fifth torque transmitting mechanism is selectively engageable to interconnect the ring gear of the first planetary gear set assembly with the stationary member.

In still another embodiment of the present invention, the sixth torque transmitting mechanism is selectively engageable to interconnect the carrier member of the second planetary gear set with the stationary member.

In still another embodiment of the present invention, the carrier member of the second planetary gear set assembly rotatably supports a first and a second plurality of pinion gears and the first plurality of pinion gears mesh with the second plurality of pinion gears and the second sun gear and the second plurality of pinion gears mesh with the first sun gear at a first end and with the ring gear and the second plurality of pinion gears at a second end.

Further aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 5 is a truth table presenting the state of engagement of the various torque transmitting elements in each of the available forward and reverse speeds or gear ratios of the transmissions illustrated in FIGS. 1 through 4.

DETAILED DESCRIPTION

The following description is merely exemplary in nature and is not intended to limit the present disclosure, application, or uses.

Figure 1:
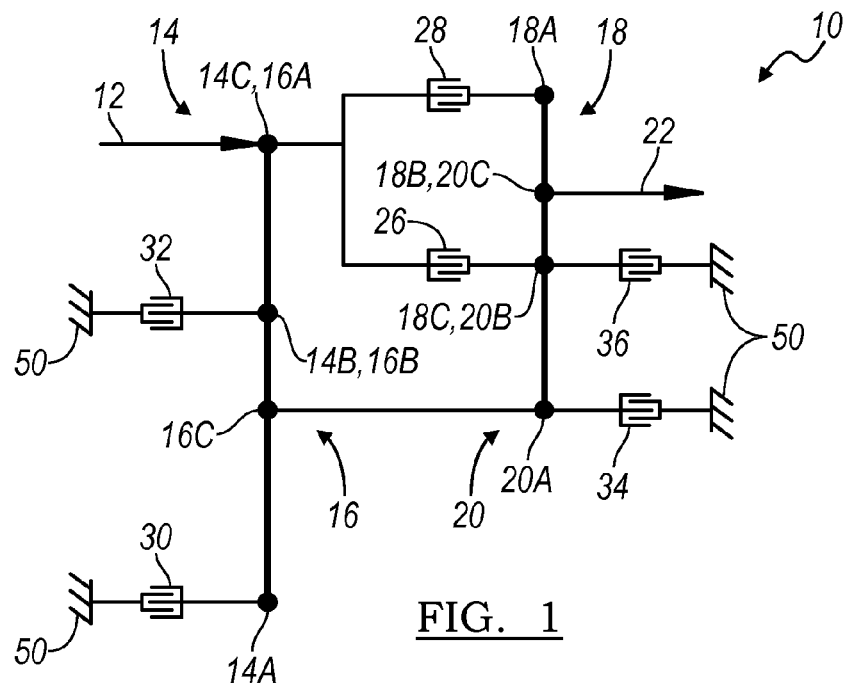
FIG. 1 is a lever diagram of an embodiment of a nine speed transmission according to the present invention.

Referring now to FIG. 1, an embodiment of a nine speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18, a fourth planetary gear set 20 and an output shaft or member 22. In the lever diagram of FIG. 1, the levers for the first planetary gear set 14 and the second planetary gear set 16 have been combined into a single four node lever having: a first node 14A, a second node 16C, a third node 14B, 16B and a fourth node 16A, 14C. Thus, the second member 14B of the first planetary gear set is coupled to the second member 16B of the second planetary gear set and the third member 14C of the first planetary gear set is coupled to the first member 16A of the second planetary gear set. The levers for the third planetary gear set 18 and the fourth planetary gear set 20 have been combined into a single four node lever having: a first node 18A, a second node 18B, 20C, a third node 18C, 20B and a fourth node 20A. Thus, the second member 18B of the third planetary gear set 18 is coupled to the third member 20C of the fourth planetary gear set and the third member 18C of the third planetary gear set 18 is coupled to the second member 20B of the fourth planetary gear set. The input member 12 is coupled to the fourth node 14C. The output member 22 is coupled to the second node 18B, 20C. The fourth node 20A is coupled to the second node 16C.

A first clutch 26 selectively connects the input member or shaft 12 and the fourth node 14C, 16A of the combined levers of the first and second planetary gear sets 14, 16 with the third node 18C, 20B of the combined levers of the third and fourth planetary gear sets 18, 20. A second clutch 28 selectively connects the input member or shaft 12 and the fourth node 14C, 16A of the combined levers of the first and second planetary gear sets 14, 16 with the first node 18A of the combined levers of the third and fourth planetary gear sets 18, 20. A first brake 30 selectively connects the first node 14A of the combined levers of the first and second planetary gear sets 14, 16 with a stationary member or transmission housing 50. A second brake 32 selectively connects the third node 14B, 16B of the combined levers of the first and second planetary gear sets 14, 16 with a stationary member or transmission housing 50. A third brake 34 selectively connects the second node 16C of the combined levers of the first and second planetary gear sets 14, 16 and the fourth node 20A of the combined levers of the third and fourth planetary gear sets 18, 20 with a stationary member or transmission housing 50.

A fourth brake 36 selectively connects the third node 18C, 20B of the third and fourth planetary gear sets 18, 20 with a stationary member or transmission housing 50.

Figure 2:
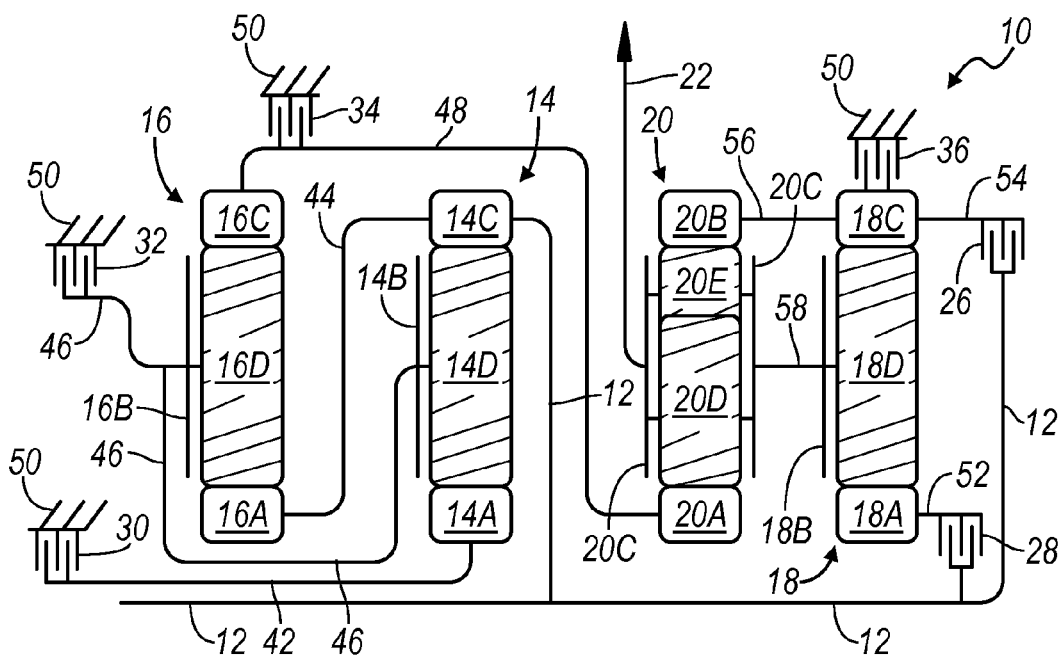
FIG. 2 is a diagrammatic illustration of an embodiment of a nine speed transmission according to the present invention.

Referring now to FIG. 2, a stick diagram presents a schematic layout of the embodiment of the nine speed transmission 10 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the planetary gear set 14 includes a sun gear member 14A, a ring gear member 14C and a planet gear carrier member 14B that rotatably supports a set of planet gears 14D (only one of which is shown). The sun gear member 14A is connected for common rotation with a first shaft or interconnecting member 42. The ring gear member 14C is connected for common rotation with input shaft or member 12 and with a second shaft or interconnecting member 44. The planet carrier member 14B is connected for common rotation with a third shaft or interconnecting member 46. The planet gears 14D are each configured to intermesh with both the sun gear member 14A and the ring gear member 14C.

The planetary gear set 16 includes a ring gear member 16C, a sun gear member 16A and a planet gear carrier member 16B that rotatably supports a set of planet gears 16D (only one of which is shown). The sun gear member 16A is connected for common rotation with the second shaft or interconnecting member 44. The ring gear member 16C is connected for common rotation with the fourth shaft or interconnecting member 48. The planet carrier member 16B is connected for common rotation with the third shaft or interconnecting member 46. The planet gears 16D are each configured to intermesh with both the sun gear member 16A and the ring gear member 16C.

The planetary gear set 18 includes a ring gear member 18C, a sun gear member 18A and a planet gear carrier member 18B that rotatably supports a set of planet gears 18D (only one of which is shown). The sun gear member 18A is connected for common rotation with a fifth shaft or interconnecting member 52. The ring gear member 18C is connected for common rotation with a sixth shaft or interconnecting member 54 and a seventh shaft or interconnecting member 56. The planet carrier member 18B is connected for common rotation with an eighth shaft or interconnecting member 58. The planet gears 18D are each configured to intermesh with both the sun gear member 18A and the ring gear member 18C.

The planetary gear set 20 includes a ring gear member 20B, a sun gear member 20A and a planet gear carrier member 20C that rotatably supports a first set of planet gears 20D (only one of which is shown) and a second set of planet gears 20E (only one of which is shown). The sun gear member 20A is connected for common rotation with the fourth shaft or interconnecting member 48. The ring gear member 20B is connected for common rotation with the seventh shaft or interconnecting member 56. The planet carrier member 20C is connected for common rotation with output member 22 and the eighth shaft or interconnecting member 58. The first set of planet gears 20D are each configured to intermesh with both the sun gear member 20A and second set of planet gears 20E. The second set of planet gears 20E are each configured to intermesh with both the ring gear member 20B and first set of planet gears 20D.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or clutches 26, 28 and first brake 30, second brake 32, third brake 34 and fourth brake 36 allow for selective interconnection of the shafts or interconnecting members, members of the planetary gear sets and the housing. For example, the first clutch 26 is selectively engageable to connect the input shaft or member 12 with the sixth shaft or interconnecting member 54. The second clutch 28 is selectively engageable to connect the input shaft or member 12 with the fifth shaft or interconnecting member 52. The first brake 30 is selectively engageable to connect the first shaft or interconnecting member 42 with the stationary element or the transmission housing 50 in order to restrict the member 42 from rotating relative to the transmission housing 50. The second brake 32 is selectively engageable to connect the third shaft or interconnecting member 46 with the stationary element or the transmission housing 50 in order to restrict the member 46 from rotating relative to the transmission housing 50. The third brake 34 is selectively engageable to connect the fourth shaft or interconnecting member 48 with the stationary element or the transmission housing 50 in order to restrict the member 48 from rotating relative to the transmission housing 50. The fourth brake 36 is selectively engageable to connect the ring gear member 18C with the stationary element or the transmission housing 50 in order to restrict ring gear member 18C from rotating relative to the transmission housing 50.

Figures 3, 4:
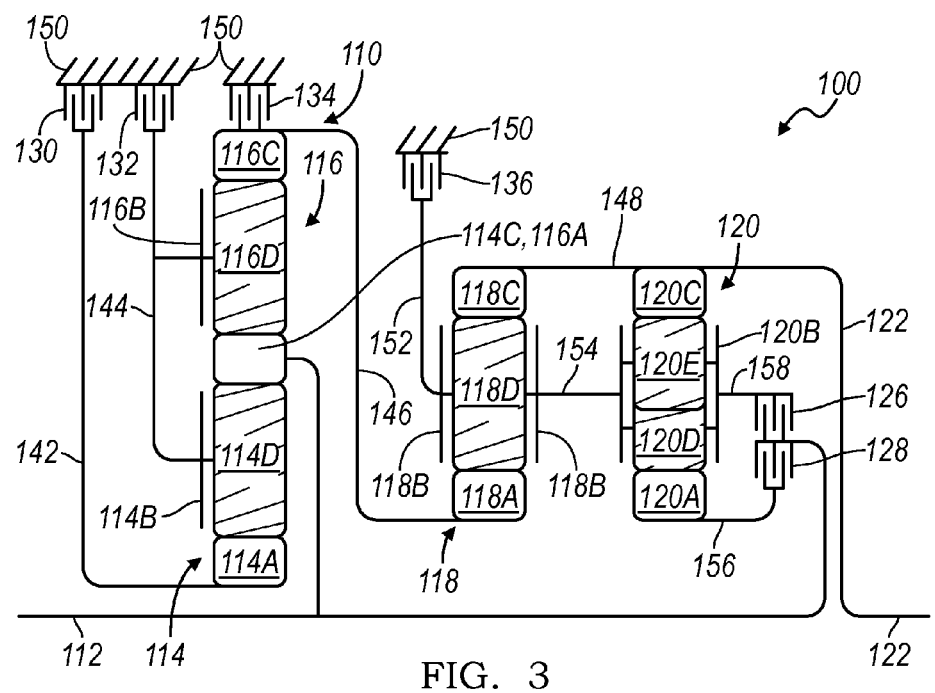
FIG. 3 is a diagrammatic illustration of another embodiment of a nine speed transmission according to the present invention.
FIG. 4 is a diagrammatic illustration of another embodiment of a nine speed transmission according to the present invention.

Referring now to FIG. 3, a stick diagram of another embodiment of a nine speed transmission 100 according to the present invention is illustrated. Transmission 100 includes a planetary gear set assembly 110. Planetary gear set assembly 110 is formed from combining two planetary gear sets 114 and 116. The ring gear of planetary gear set 114 and the sun gear of planetary gear set 116 are formed as a single or common component or member 114C, 116A. Thus, with respect to planetary gear set 114, component 114C, 116A functions as a ring gear and with respect to planetary gear set 116, component 114C, 116A functions as a sun gear. The shared component or common member 114C, 116A enables the first and second planetary gear sets 114 and 116 to be stacked or arranged radially, where the second planetary gear set 116 is positioned radially outward of the first planetary gear set 114 (as shown in FIG. 3). Accordingly, the shared component or common member 114C, 116A is a gear having an outer surface and an inner surface. The outer surface of common member 114C, 116A has a plurality of gear teeth that enable common member to function as a sun gear. The inner surface of common member 114C, 116A has a plurality of gear teeth that enable common member to function as a ring gear. Moreover, planetary gear set 114 includes a sun gear member 114A and a planet gear carrier member 114B that rotatably supports a set of planet gears 114D (only one of which is shown). The sun gear member 114A is connected for common rotation with a first shaft or interconnecting member 142. The common member 114C, 116A is connected for common rotation with the input shaft or interconnecting member 112. The planet carrier member 114B is connected for common rotation with a second shaft or interconnecting member 144. The planet gears 114D are each configured to intermesh with both the sun gear member 114A and the common member 114C, 116A. Further, planetary gear set 116 includes a ring gear member 116C and a planet gear carrier member 116B that rotatably supports a set of planet gears 116D (only one of which is shown). The ring gear member 116C is connected for common rotation with a third shaft or interconnecting member 146. The planet carrier member 116B is connected for common rotation with the second shaft or interconnecting member 144. The planet gears 116D are each configured to intermesh with both the ring gear member 116C and the common member 114C, 116A.

A planetary gear set 118 includes a sun gear member 118A, a ring gear member 118C and a planet gear carrier member 118B that rotatably supports a set of planet gears 118D (only one of which is shown). The sun gear member 118A is connected for common rotation with a third shaft or interconnecting member 146. The ring gear member 118C is connected for common rotation with a fourth shaft or interconnecting member 148. The planet carrier member 118B is connected for common rotation with a fifth shaft or interconnecting member 152 and a sixth shaft or interconnecting member 154. The planet gears 118D are each configured to intermesh with both the sun gear member 118A and the ring gear member 118C.

The planetary gear set 120 includes a ring gear member 120C, a sun gear member 120A and a planet gear carrier member 120B that rotatably supports a first set of planet gears 120D (only one of which is shown) and a second set of planet gears 120E (only one of which is shown). The sun gear member 120A is connected for common rotation with a seventh shaft or interconnecting member 156. The ring gear member 120C is connected for common rotation with the fourth shaft or interconnecting member 148 and the output shaft or member 122. The planet carrier member 120B is connected for common rotation with the sixth shaft or interconnecting member 154 and with an eighth shaft or interconnecting member 158. The first set of planet gears 120D are each configured to intermesh with both the sun gear member 120A and the second set of planet gears 120E. The second set of planet gears 120E are each configured to intermesh with both the ring gear member 120C and the first set of planet gears 120D.

Transmission 100 further includes torque-transmitting mechanisms or clutches 126, 128, first brake 130, second brake 132, third brake 134 and fourth brake 136 that allow for selective interconnection of the shafts or interconnecting members, members of the planetary gear sets and the housing. For example, the first clutch 126 is selectively engageable to connect the input shaft or member 112 with the eighth shaft or interconnecting member 158. The second clutch 128 is selectively engageable to connect the input shaft or member 112 with the seventh shaft or interconnecting member 156. The first brake 130 is selectively engageable to connect the first shaft or interconnecting member 142 with the stationary element or the transmission housing 150 in order to restrict the member 142 from rotating relative to the transmission housing 150. The second brake 132 is selectively engageable to connect the second shaft or interconnecting member 144 with the stationary element or the transmission housing 150 in order to restrict the member 144 from rotating relative to the transmission housing 150. The third brake 134 is selectively engageable to connect the third shaft or interconnecting member 146 and ring gear 116C with the stationary element or the transmission housing 150 in order to restrict the member 146 and ring gear 116C from rotating relative to the transmission housing 150. The fourth brake 136 is selectively engageable to connect the fifth shaft or interconnecting member 152 with the stationary element or the transmission housing 150 in order to restrict interconnecting member 152 from rotating relative to the transmission housing 150.

Referring now to FIG. 4, a stick diagram of yet another embodiment of a nine speed transmission 200 according to the present invention is illustrated. Transmission 200 includes the planetary gear set assembly 110, as described above and shown in FIG. 3, and a planetary gear set assembly 210. As will be described below and illustrated in FIG. 4, planetary gear set assembly 210 is formed from planetary gear sets 118 and 120 of the previous embodiment and configured as a Ravigneaux Gear Train.

More specifically, the Simpson Gear Train or planetary gear set assembly 210 is formed by combining the ring gears 118C and 120C into a unitary ring gear member 118C, 120C. Moreover, planet carrier members 118B and 120B are combined to form a single common planet carrier member 118B, 120B. Planet carrier member 118B, 120B supports a long planet pinion 120E' that replaces the planet pinion gear 120E of the above described embodiment and planet pinion 120D. Long planet pinion 120E' meshes with the ring gear member 118C, 120C and with planet pinion 120D at a first end 121A and with the sun gear 118A at a second end 121B.

The shafts or interconnecting members 142, 144, 146, 156 and 158 configured to connect the same members of the planetary gear sets as described in the previous embodiment with the exception of shafts 148 and 154, which have been eliminated. Furthermore, shaft 152 now connects the brake 136 to the common planet carrier member 118B, 120B and shaft 158 now connects the clutch 126 to the planet carrier member 118B, 120B.

Moreover, as in the previous embodiment, the first clutch 126 is selectively engageable to connect the input shaft or member 112 with the eighth shaft or interconnecting member 158. The second clutch 128 is selectively engageable to connect the input shaft or member 112 with the seventh shaft or interconnecting member 156. Accordingly, the first brake 130 is selectively engageable to connect the first shaft or interconnecting member 142 with the stationary element or the transmission housing 150 in order to restrict the member 142 from rotating relative to the transmission housing 150. The second brake 132 is selectively engageable to connect the second shaft or interconnecting member 144 with the stationary element or the transmission housing 150 in order to restrict the member 144 from rotating relative to the transmission housing 150. The third brake 134 is selectively engageable to connect the third shaft or interconnecting member 146 and ring gear 116C with the stationary element or the transmission housing 150 in order to restrict the member 146 and ring gear 116C from rotating relative to the transmission housing 150. The fourth brake 136 is selectively engageable to connect the fifth shaft or interconnecting member 152 with the stationary element or the transmission housing 150 in order to restrict interconnecting member 152 from rotating relative to the transmission housing 150.

Referring now to FIG. 2 through FIG. 5, the operation of the embodiments of the nine speed transmissions 10, 100 and 200 will be described. It will be appreciated that transmissions 10, 100 and 200 is capable of transmitting torque from the input shaft or members 12 and 122 to the output shaft or members 22 and 122 in at least nine forward speed or torque ratios and at least one reverse speed or torque ratio. Each forward and reverse speed or torque ratio is attained by engagement of one or more of the torque-transmitting mechanisms, as will be explained below. FIG. 5 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria. Of course, other gear ratios are achievable depending on the gear diameter, gear teeth count and gear configuration selected.

With respect to transmission 10, a reverse gear ratio is established by activating first brake 30 and fourth brake 36. The first brake 30 connects the first shaft or interconnecting member 42 with the stationary element or the transmission housing 50 in order to restrict the member 42 from rotating relative to the transmission housing 50. The fourth brake 36 connects the ring gear member 18C with the stationary element or the transmission housing 50 in order to restrict the member 18C from rotating relative to the transmission housing 50. Likewise, the nine forward ratios are achieved through different combinations of clutch and brake engagement, as shown in FIG. 5.

With respect to transmissions 100 and 200, a reverse gear ratio is established by activating first brake 130 and fourth brake 136. The first brake 130 connects the first shaft or interconnecting member 142 with the stationary element or the transmission housing 150 in order to restrict the member 142 from rotating relative to the transmission housing 150. The fourth brake 136 connects fifth shaft or interconnecting member 152 with the stationary element or the transmission housing 150 in order to restrict the member 152 from rotating relative to the transmission housing 150. Likewise, the nine forward ratios are achieved through different combinations of clutch and brake engagement, as shown in FIG. 5.

It will be appreciated that the foregoing explanation of operation and gear states of the nine speed transmissions 10, 100 and 200 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
   an input member;
   an output member;
   a first planetary gear set having a first, a second and a third member;
   a second planetary gear set having a first, a second and a third member;
   a third planetary gear set having a first, a second and a third member;
   a fourth planetary gear set having a first, a second and a third member;
   a first interconnecting member continuously interconnecting the second member of the first planetary gear set with the second member of the second planetary gear set;
   a second interconnecting member continuously interconnecting the third member of the first planetary gear set with the first member of the second planetary gear set;
   a third interconnecting member continuously interconnecting the third member of the second planetary gear set with the first member of the fourth planetary gear set;
   a fourth interconnecting member continuously interconnecting the third member of the third planetary gear set with the second member of the fourth planetary gear set;
   a fifth interconnecting member continuously interconnecting the second member of the third planetary gear set with the third member of the fourth planetary gear set; and
   six torque transmitting mechanisms each selectively engageable to interconnect at least one of the first, second and third members of the first, second, third and fourth planetary gear sets with at least one other of the first, second and third members of the first, second, third and fourth planetary gear sets and a stationary member, and
   wherein the six torque transmitting mechanisms are selectively engageable in combinations of at least two to establish at least nine forward speed ratios and at least one reverse speed ratio between the input member and the output member.

2. The transmission of claim 1 wherein a first of the six torque transmitting mechanisms is selectively engageable to interconnect the third member of the third planetary gear set and the second member of the fourth planetary gear set with the input member.

3. The transmission of claim 2 wherein a second of the six torque transmitting mechanisms is selectively engageable to interconnect the first member of the third planetary gear set with the input member.

4. The transmission of claim 3 wherein a third of the six torque transmitting mechanisms is selectively engageable to interconnect the first member of the first planetary gear set with the stationary member.

5. The transmission of claim 4 wherein a fourth of the six torque transmitting mechanisms is selectively engageable to interconnect the second member of the first planetary gear set and the second of the second planetary gear set with the stationary member.

6. The transmission of claim 5 wherein a fifth of the six torque transmitting mechanisms is selectively engageable to interconnect the third member of the second planetary gear set and the first member of the fourth planetary gear set with the stationary member.

7. The transmission of claim 6 wherein a sixth of the six torque transmitting mechanisms is selectively engageable to interconnect the third member of the third planetary gear set and the second member of the fourth planetary gear set with the stationary member.

8. The transmission of claim 1 wherein the first members of the first, second, third and fourth planetary gear sets are sun gears, the second members of the first, second and third planetary gear sets and the third member of the fourth planetary gear set are carrier members and the third members of the first, second and third planetary gear sets and the second member of the fourth planetary gear set are ring gears.

9. The transmission of claim 8 wherein the ring gear of the first planetary gear set and the sun gear of the second planetary gear set member is formed as a unitary gear member having an outer surface and an inner surface, wherein the outer surface has a plurality of gear teeth and the inner surface has a plurality of gear teeth.

10. The transmission of claim 9 wherein the unitary gear member meshes with a first plurality of pinion gears rotatably supported by the carrier member of the first planetary gear set and a second plurality of pinion gears rotatably supported by the carrier member of the second planetary gear set.

11. The transmission of claim 10 wherein the carrier member of the first planetary gear set and the carrier member of the second planetary gear set assembly are formed as a single carrier member.

12. A transmission comprising:

an input member;

an output member;

a planetary gear set assembly having a first member, a second member, a third member, a fourth member and a fifth member;

a first planetary gear set having a first, a second and a third member;

a second planetary gear set having a first, a second and a third member;

a first interconnecting member continuously interconnecting the fourth member of the planetary gear set assembly with the first member of the first planetary gear set;

a second interconnecting member continuously interconnecting the second member of the first planetary gear set with the second member of the second planetary gear set;

a third interconnecting member continuously interconnecting the third member of the first planetary gear set with the third member of the second planetary gear set;

a first torque transmitting mechanism selectively engageable to interconnect the second member of the second planetary gear set and the second member of the first planetary gear set with the input member;

a second torque transmitting mechanism selectively engageable to interconnect the first member of the second planetary gear set with the input member;

a third torque transmitting mechanism selectively engageable to interconnect the first member of the planetary gear set assembly with a stationary member;

a fourth torque transmitting mechanism selectively engageable to interconnect the second and third members of the planetary gear set assembly with the stationary member;

a fifth torque transmitting mechanism selectively engageable to interconnect the fourth member of the planetary gear set assembly with the stationary member; and a sixth torque transmitting mechanism selectively engageable to interconnect the second member of the first planetary gear set and the second member of the second planetary gear set with the stationary member, and wherein the torque transmitting mechanisms are selectively engageable in combinations of at least two to establish at least nine forward speed ratios and at least one reverse speed ratio between the input member and the output member.

13. The transmission of claim 12 wherein the first members of the first and second planetary gear sets and the first member of the planetary gear set assembly are sun gears, the second and third members of the planetary gear set assembly and the second members of the first and second planetary gear sets are carrier members and the third members of the first and second planetary gear sets and fourth member of the planetary gear set assembly are ring gears.

14. The transmission of claim 12 wherein the fifth member of the planetary gear set assembly is a gear having an outer surface and an inner surface, wherein the outer surface has a plurality of gear teeth and the inner surface has a plurality of gear teeth.

15. The transmission of claim 12 wherein the fifth member of the planetary gear set assembly meshes with the a first plurality of pinion gears rotatably supported by the second member of the planetary gear set assembly and with a second plurality of pinion gears rotatably supported by the third member of the planetary gear set assembly.

16. A transmission comprising:

an input shaft;

an output shaft;

a first planetary gear set having a sun gear, a carrier member for rotatably supporting a plurality of pinion gears and a ring gear member;

a second planetary gear set having a sun gear, a carrier member for rotatably supporting a first set of pinion gears and a second set of pinion gears and a ring gear member, wherein the first set of pinion gears mesh with the sun gear of the second planetary gear set and second set of pinion gears, and wherein the second set of pinion gears mesh with the ring gear of the second planetary gear set and the first set of pinion gears;

a planetary gear set assembly having a sun gear, a first carrier member for rotatably supporting a first plurality of pinion gears and a second carrier member for rotatably supporting a second plurality of pinion gears, a ring gear and a common member, wherein the first plurality of pinion gears are disposed radially inward of the common member and the second plurality of pinion gears are disposed radially outward of the common member;

a first interconnecting member continuously interconnecting the ring gear of the planetary gear set assembly with the sun gear of the first planetary gear set;

a second interconnecting member continuously interconnecting the ring gear of the first planetary gear set with the ring gear of the second planetary gear set;

a third interconnecting member continuously interconnecting the carrier member of the first planetary gear set with the carrier member of the second planetary gear set;

a fourth interconnecting member continuously interconnecting the first carrier member of the planetary gear set assembly with the second carrier member of the planetary gear set assembly;

a first torque transmitting mechanism selectively engageable to interconnect the carrier member of the second planetary gear set and the carrier member of the first planetary gear set with the input member;

a second torque transmitting mechanism selectively engageable to interconnect the sun gear of the second planetary gear set with the input member;

a third torque transmitting mechanism selectively engageable to interconnect the sun gear of the planetary gear set assembly with a stationary member;

a fourth torque transmitting mechanism selectively engageable to interconnect the first and second carrier members of the planetary gear set assembly with the stationary member;

a fifth torque transmitting mechanism selectively engageable to interconnect the ring gear of the planetary gear set assembly with the stationary member; and a sixth torque transmitting mechanism selectively engageable to interconnect the carrier member of the first planetary gear set and the carrier member of the second planetary gear set with the stationary member, and wherein the torque transmitting mechanisms are selectively engageable in combinations of at least two to establish at least nine forward speed ratios and at least one reverse speed ratio between the input member and the output member.

17. The transmission of claim 16 wherein the common member of the planetary gear set assembly is a gear having an outer surface and an inner surface, wherein the outer surface has a plurality of gear teeth and the inner surface has a plurality of gear teeth, and wherein the plurality of gear teeth disposed on the inner surface mesh with the first plurality of pinion gears and the plurality of gear teeth disposed on the outer surface mesh with the second plurality of pinion gears.

18. A transmission comprising:
   an input shaft;
   an output shaft;
   a first planetary gear set assembly having a sun gear, a carrier member for rotatably supporting a first plurality of pinion gears and a second plurality of pinion gears, a ring gear and a common member, wherein the first plurality of pinion gears is disposed radially inward of the common member and the second plurality of pinion gears is disposed radially outward of the common member;
   a second planetary gear set assembly having a first and a second sun gear, a carrier member for rotatably supporting a first and a second plurality of pinion gears and a ring gear member;
   an interconnecting member continuously interconnecting the ring gear of the first planetary gear set assembly with the first sun gear of the second planetary gear set assembly;
   a first torque transmitting mechanism selectively engageable to interconnect the common member of the first planetary gear set assembly and the input member with the second sun gear of the second planetary gear set assembly;
   a second torque transmitting mechanism selectively engageable to interconnect the common member of the first planetary gear set assembly and the input member with the carrier member of the second planetary gear set assembly;
   a third torque transmitting mechanism selectively engageable to interconnect the sun gear of the first planetary gear set assembly with a stationary member;
   a fourth torque transmitting mechanism selectively engageable to interconnect the carrier member of the first planetary gear set assembly with the stationary member;
   a fifth torque transmitting mechanism selectively engageable to interconnect the ring gear of the first planetary gear set assembly with the stationary member; and
   a sixth torque transmitting mechanism selectively engageable to interconnect the carrier member of the second planetary gear set with the stationary member, and
   wherein the torque transmitting mechanisms are selectively engageable in combinations of at least two to establish at least nine forward speed ratios and at least one reverse speed ratio between the input member and the output member.

19. The transmission of claim 18 wherein the common member of the first planetary gear set assembly is a gear having an outer surface and an inner surface, wherein the outer surface has a plurality of gear teeth and the inner surface has a plurality of gear teeth, and wherein the plurality of gear teeth disposed on the inner surface mesh with the first plurality of pinion gears and the plurality of gear teeth disposed on the outer surface mesh with the second plurality of pinion gears.

20. The transmission of claim 19 wherein the carrier member of the second planetary gear set assembly rotatably supports a first and a second plurality of pinion gears and wherein the first plurality of pinion gears mesh with the second plurality of pinion gears and the second sun gear and the second plurality of pinion gears mesh with the first sun gear at a first end and with the ring gear of the second planetary gear set assembly and the first plurality of pinion gears at a second end.

* * * * *